91-260 SR
FIP: 04/96 OR RE01260
FREDERICK ELSWORTH SICKELS
Sheet No. 1.
No. 1,260.
MOVING ADJUSTABLE CAM.
COMBINED WITH A
DROP-VALVE CUT-OFF.
Re 1260
Reissued Jany. 21. 1862. Patented: Sept: 19th 1845
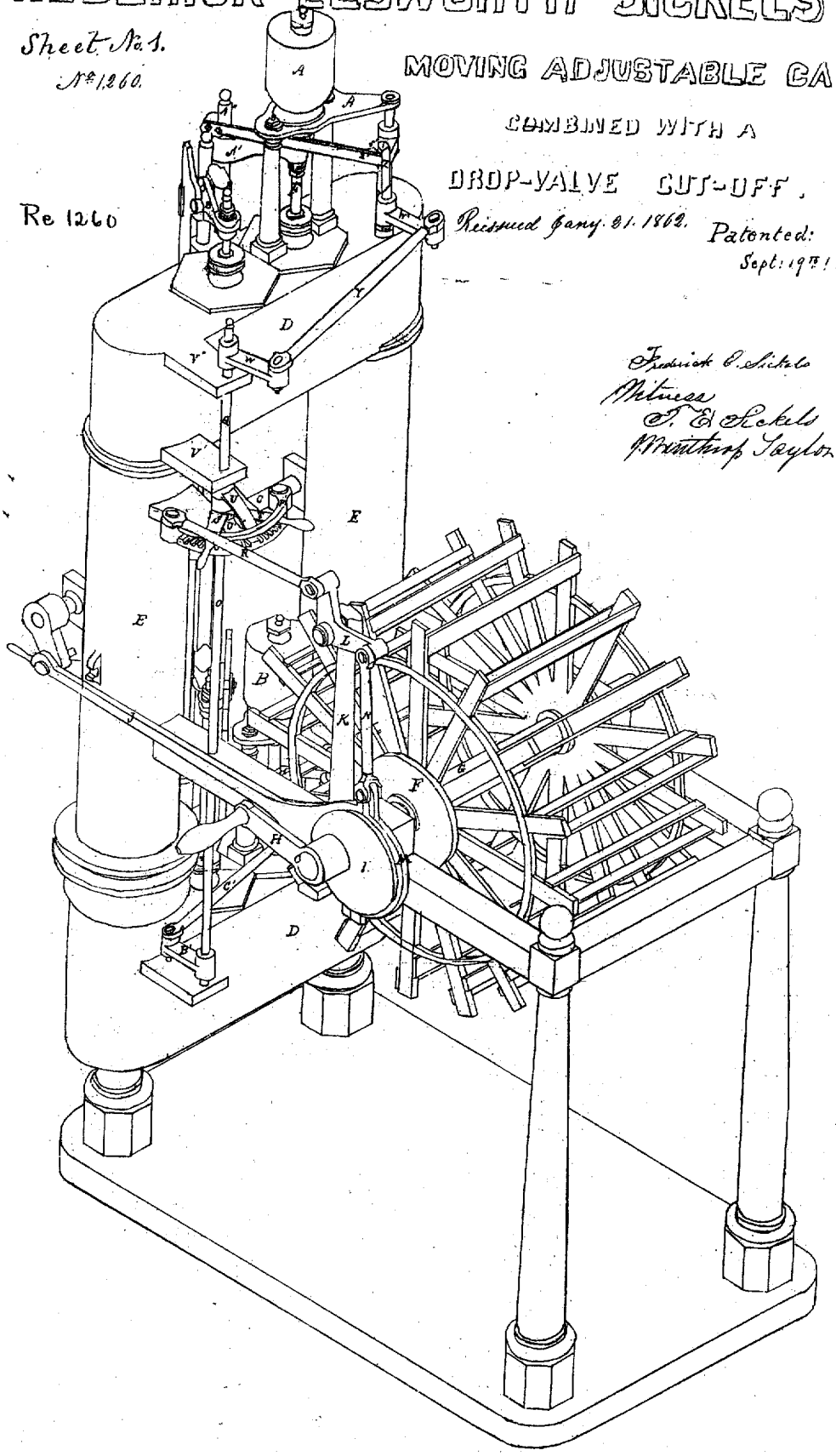
Frederick E. Sickels
Witness
T. E. Sickels
Winthrop Taylor Sheet No. 2.
No. 1,260
Frederick C. Sickels
Witness T. E. Sickels
J. Winthrop Taylor
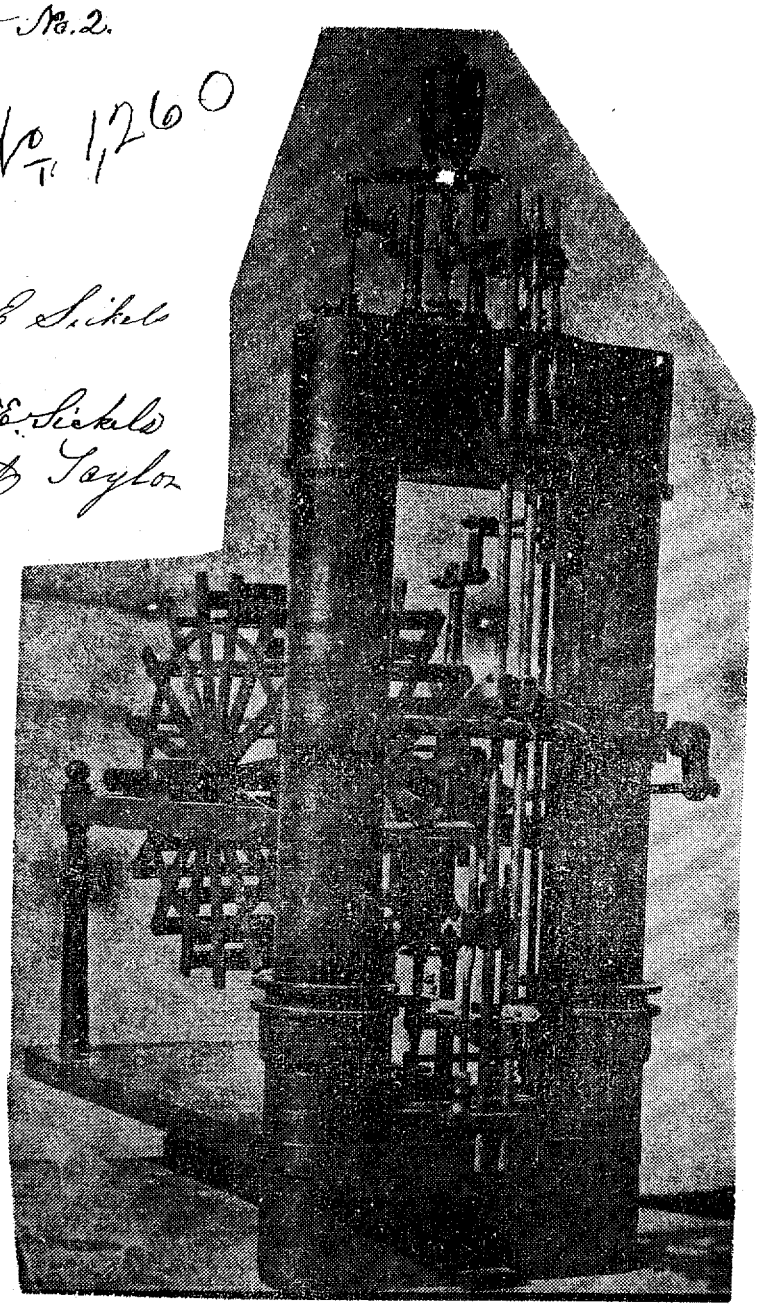

Sheet No 3.
No 11,260
Frederick C Sickels
Witness
F. E. Sickels
Merritt Taylor
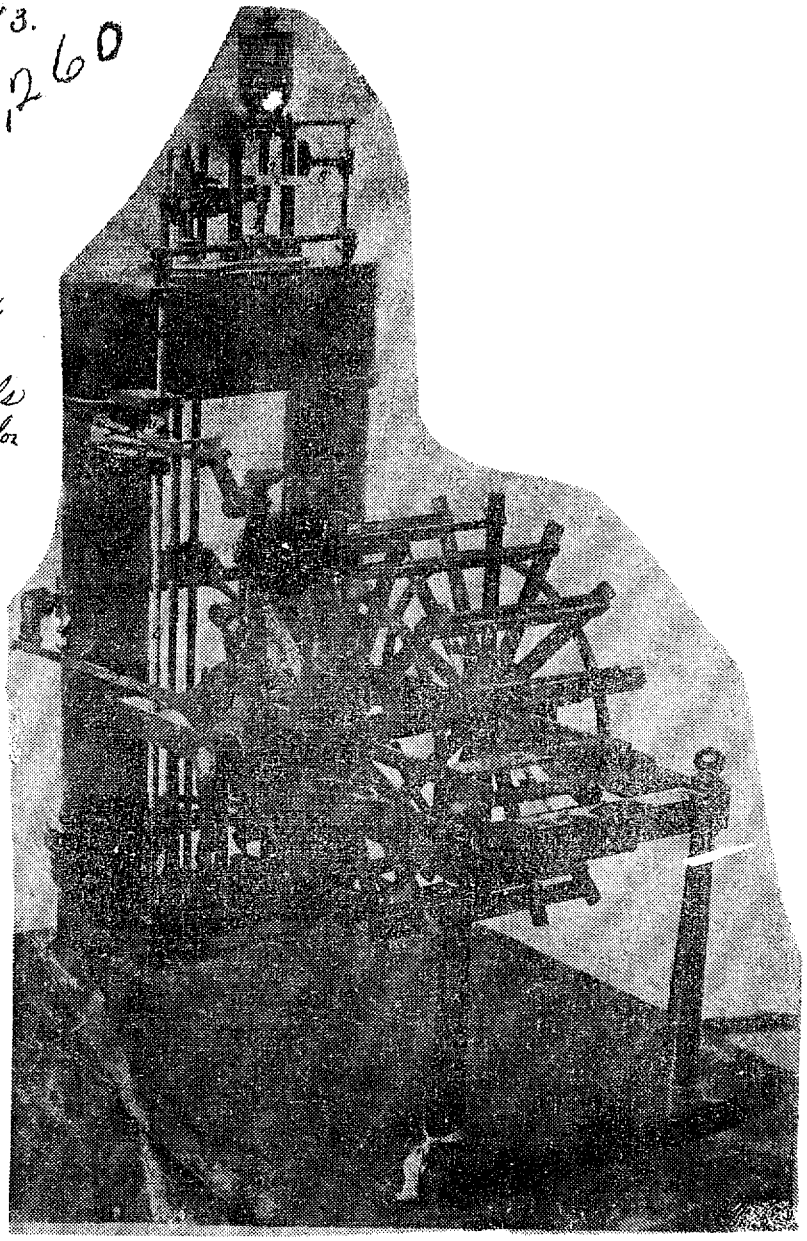

Sheet No 4
RE 1260
1-21-1868
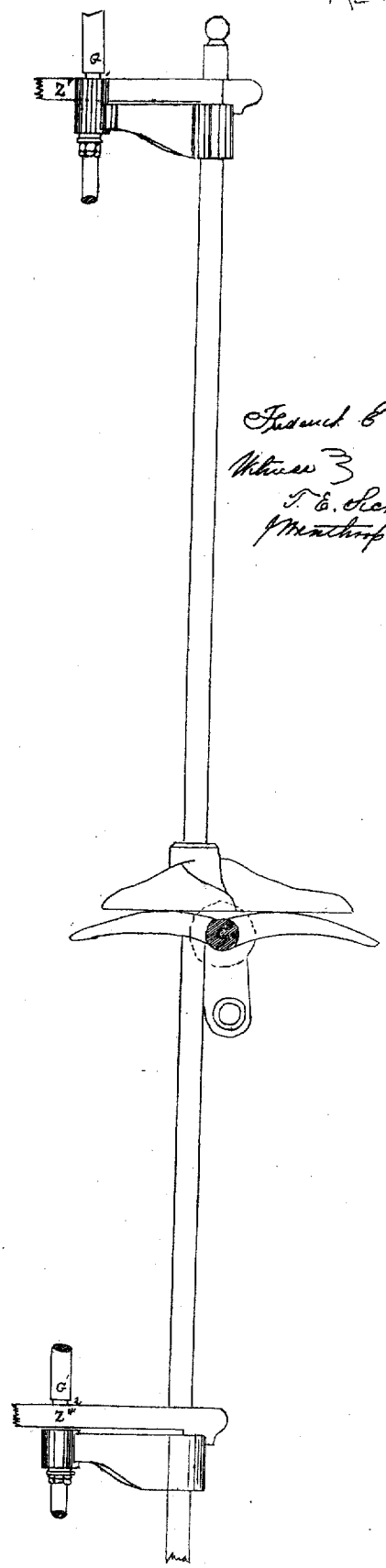
Frederick C Sickels
Witness 3
T. E. Sickels
J Meacham Taylor

UNITED STATES PATENT OFFICE.

FREDERICK E. SICKELS, OF NEW YORK, N. Y.

IMPROVEMENT IN STEAM-ENGINES.

Specification forming part of Letters Patent No. 4,202, dated September 19, 1845; Reissue No. 910, dated February 21, 1860; Reissue No. 1,260, dated January 21, 1862.

*To all whom it may concern:*

Be it known that I, FREDERICK E. SICKELS, of the city of New York, and county and State of New York, have invented a new and useful Improvement in Steam-Engines; and I do hereby declare that the following is a full, clear, and exact description of the character thereof which distinguishes it from all other things before known, and of the manner of making and using the same, reference being had to the accompanying drawings, which make a part of this specification.

The nature of my improvement consists in the co existing movement of two reciprocating catching-pieces, each moving during a longer time than half a revolution of the main shaft of the engine, whereby a greater capacity for adjustment in opening the valve and a greater certainty in connecting with the catch are secured than if one catching-piece comes to a state of rest before the other moves, and each catching-piece moves only during one-half the revolution of the engine, as has been the mode of operating in trip cut-offs heretofore.

In the accompanying drawings, Sheets Nos. 1, 2, and 3, three views are shown of this improvement in connection with others patented to me the same day as this, and they will be described, in part, to facilitate the explanation of the improvement herein patented, notwithstanding it may be used without them.

The same letters refer to the same parts in each figure.

F is a valve rod or stem, having a piston or plunger attached to its upper end, operating within a reservoir, A, shaped smaller at the bottom, which may confine the fluid contained therein, as the plunger descends, substantially in the same manner described in the patent granted to me May 20, 1842, so as to regulate the velocity of a falling weight connected to the stem, that is sufficient to overcome all friction in closing the valve. To this rod or stem the valve must be attached.

Either single, double, or slide valves may be used. If a weight or other force to move the valve in closing, and a stop to hold the catch within the range of the engaging mechanism are not provided with, or by the valve selected, they should be added thereto.

A spring, L′, has a catch-piece, L″, connected to it that fits into a notch formed by the catch G, and extends beyond, which piece L″ has a curved projection, S′, at the extreme end, against which the outer face of this arm or wiper L strikes as it vibrates on its vertical axis. The outer face of this arm or wiper is parallel with its shaft or axle, and is of greater length than the motion of the lifter, so that it can act upon the curved projection upon the catch-piece L″, as it is carried up and down by the lifter, so as to determine the time when the weight shall close the valve.

The vibratory motion of the arm or wiper L is obtained in the following manner: On its axle there is an arm, W′, connected by a rod, Y, with a similar arm, W, on the upper end of a vertical shaft, Q, which has a spring-arm, T, at its lower end (the outer end handle form) with its under face provided with a fillet or catch to fall into the teeth on the upper face of the sector P, that vibrates on the axis of the shaft Q, and is held by means of arms U U that project from two collars that turn one on the lower end of the shaft Q and the other on the upper ends of a corresponding shaft, O, below it. From one end of this sector a connecting-rod, R, extends to one arm of a bell-crank, L, the other arm of which is connected by a connecting-rod, N, with the strap M of the eccentric I, and at right angles to the eccentric-rod J that operates the rock-shaft C of the lifters A′ A″, so that the sector P and the parts deriving motion from it are moving while the lifters are in a state of rest, and therefore the liberation of the weight to close the valve will be more rapid and can be regulated with more accuracy at this period of the stroke of the piston than if the lifter-motion alone was used, which, however, may be done in connection with the invention herein patented. The shaft O, which is below, has a spring-arm, S, similar and corresponding to the one, T, before described, and at its lower end an arm, B′, and connecting-rod C′ corresponding with the arm W and the rod Y above, and all other corresponding parts to work the cut-off valve for this end of the cylinder are substantially the same as the parts above described for the other end of the cylinder. The sector P has a plate, P′, above and parallel with it for the purpose of strength and to act as a guard for the spring-arms S T. The face of the sector P is provided with two sets of teeth, each extending from the middle or arms V V to the ends, and the length of each part of the sector is such that the motion of the spring-arms S T from one extremity to the other of the sector shall shift the position of the arm or wiper L, and the corresponding one below, so that when the spring-arms are at the outer end of the segment the arms or wipers shall vibrate without permitting the weight to move the valve to cut off, and by moving them toward the middle the extent of the cut-off shall be reduced from the maximum to the minimum—that is to say, to cut off from the greatest to the least portion of the stroke; and it will be evident that the reciprocating catch-piece can be placed to disconnect one part of the reciprocating valve motion from the other part at any convenient point on the mechanism, between the source of the motion as derived from the engine and the valve, it being desirable, however, to place it as near the valve as practicable, so that there will be as little friction as possible in the liberated parts to encounter in rapidly closing the valve.

It will be evident from the foregoing that any motion derived from any part of the engine may be substituted for the motion of the arms or wipers, provided it has motion as distinguished from the lifter motion—as, for instance, instead of the horizontal vibratory motion of the arms or wipers the time when the weight may be permitted to act to close the cut-off valve may be regulated by a vertical descending motion as the lifter rises, and in this case it will be by the co-operation of this independent motion with another motion that the catch and catch-piece are disengaged; but any motion or motions whatever, either adjustable or otherwise, can be used to disengage the catch-pieces in connection with the invention herein patented.

The catch-pieces L′ L″ derive a reciprocating opening and closing motion from the valve-gear, and operate to determine the admission of steam when their acting surfaces are in contact with the catches G G′.

It will be seen by reference to the drawings Nos. 2 and 3 that by the shape of the toes on the rock-shaft C and the feet on the lifting rods one rod is moved before the other comes to a state of rest, thereby imparting a co-existing movement to the catching-pieces L″ L‴, permitting them to pass beyond the engaging-points 1 2, and to return to them to open the valve. Therefore, the position of these points can be shifted so as to secure the desired movement in opening the valves and keeping them open (if the catching-pieces L″ L‴ are not disengaged) during one half the revolution of the main-shaft of the engine, and leaving sufficient space between the catches and the catch-pieces under the various conditions arising in practical operation to insure the re-engagment after they have been disconnected to cut off, and it is evident that the co-existing movement of the catch-pieces can be communicated to them by other sort of valve-gear than that here shown, and any valve motion having a proper co-existing movement in any of its parts can be used to move the catch-pieces.

Other forms of reciprocating valve gear, and also other forms of reciprocating catch-pieces, may be substituted for those here shown without altering the character of this invention. Sheet No. 4 shows elevation of parts before described, it being understood that the form and arrangement of them will depend in each case, as in this, upon the general arrangement of the valve-gear, and to which attention is particularly required in order to understand this invention.

C is the rock-shaft, which, by the shape and position of the upper faces of its toes with relation to the shape and position of the faces of the feet on which they act, acts upon both rods at the same time and imparts a co-existing movement to them and to the catch-pieces L″ L‴.

What I claim as new, and desire to secure by Letters Patent, is—

Imparting a co-existing movement to two reciprocating catch pieces in the operation of the trip off cut-off valves, substantially as described.

FREDERICK E. SICKELS.

Witnesses:

T. E. SICKELS,

J. WINTHROP TAYLOR.